United States Patent [19]

Wassibauer et al.

[11] Patent Number: 4,833,892
[45] Date of Patent: May 30, 1989

[54] PROCESS AND AN APPARATUS FOR THE ADJUSTMENT OR MAINTENANCE OF A REFRIGERATED ATMOSPHERE

[75] Inventors: Rüdiger Wassibauer, Puch; Werner Russ, Altenmarkt, both of Austria

[73] Assignee: Franz Welz Internationale Transporte Gesellschaft mit beschrankter Haftung, Austria

[21] Appl. No.: 14,978

[22] Filed: Feb. 17, 1987

[30] Foreign Application Priority Data

Feb. 17, 1986 [AT] Austria .................................. 401/86

[51] Int. Cl.$^4$ .............................................. F24F 3/16
[52] U.S. Cl. ........................................ 62/78; 62/216; 62/384; 62/51.1
[58] Field of Search ............... 62/78, 384, 216, 514 R

[56] References Cited

U.S. PATENT DOCUMENTS

| | | | |
|---|---|---|---|
| 3,102,777 | 9/1963 | Bedrosian et al. | 62/78 |
| 3,365,307 | 1/1968 | Dixon | 426/418 |
| 3,415,310 | 12/1968 | Kuhlmann | 62/78 |
| 3,892,104 | 7/1975 | Klee et al. | 62/216 |
| 3,958,028 | 5/1976 | Burg | 426/418 |
| 4,003,728 | 1/1977 | Rath | 62/78 |
| 4,116,017 | 9/1978 | Oberpriller | 62/514 R |
| 4,234,926 | 11/1980 | Wallace et al. | 364/551 |
| 4,237,700 | 12/1980 | Rothchild | 62/514 R |
| 4,566,282 | 1/1986 | Knoblauch et al. | 62/78 |
| 4,642,996 | 2/1987 | Harris et al. | 62/78 |
| 4,655,048 | 4/1987 | Burg | 62/78 |

FOREIGN PATENT DOCUMENTS

| | | |
|---|---|---|
| 2650821 | 5/1978 | Fed. Rep. of Germany . |
| 0153053 | 12/1981 | Fed. Rep. of Germany . |
| DD219377 | 3/1985 | Fed. Rep. of Germany . |
| 2174116 | 10/1973 | France . |

*Primary Examiner*—Ronald C. Capossela
*Attorney, Agent, or Firm*—Wood, Herron & Evans

[57] ABSTRACT

The invention relates to a process and an apparatus for the adjustment of maintenance of a refrigerated atmosphere, in particular an atmosphere adjusted to goods stored in a refrigerating tank, in particular a refrigerating container, with the refrigerating requirement exclusively covered by the introduction of cold nitrogen from a supply of liquid nitrogen.

According to the invention, the normally immobile atmosphere is forcibly circulated in arbitrarily selected time intervals or in time intervals determined by measured operating parameters (T, $CO_2$ content, $O_2$ content, humidity) during time intervals which are predetermined or determined by measured operating parameters.

The temporary circulation of the atmosphere is effected by means of a blower actuated by a control means.

19 Claims, 1 Drawing Sheet

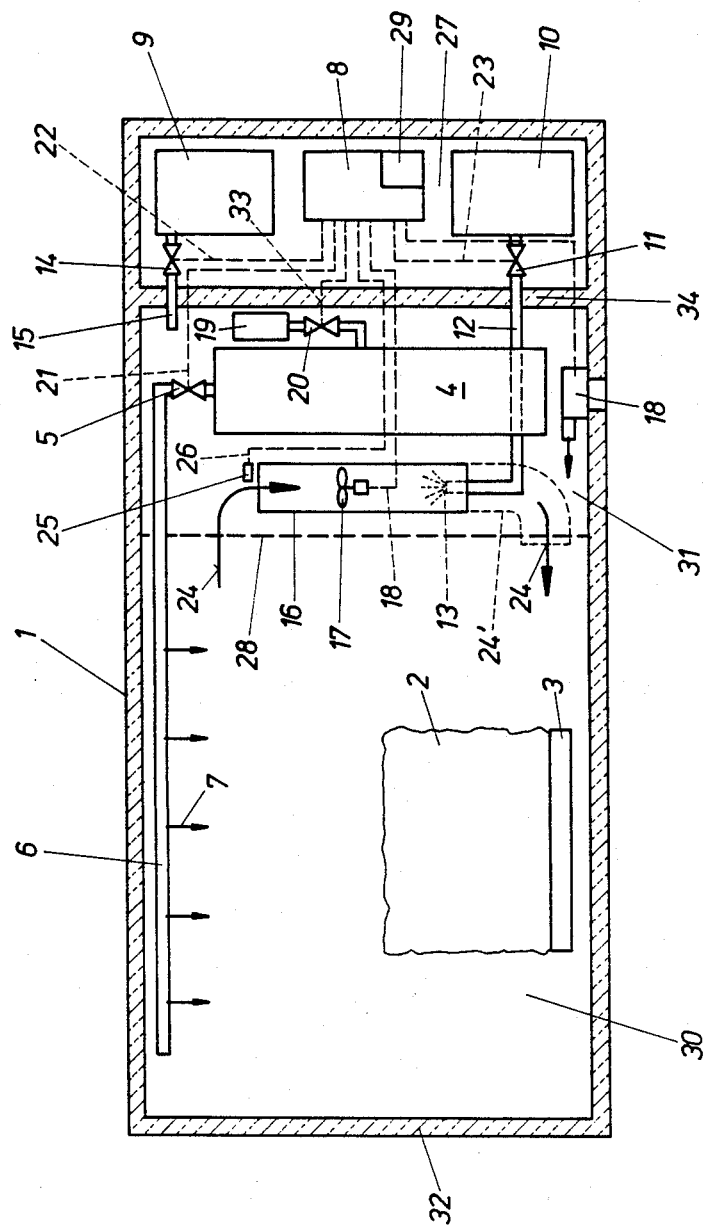

PROCESS AND AN APPARATUS FOR THE ADJUSTMENT OR MAINTENANCE OF A REFRIGERATED ATMOSPHERE

The invention relates to a process for the adjustment or maintenance of a refrigerated atmosphere, in particular an atmosphere adjusted to goods stored in a refrigerating tank, in particular a refrigerating container, with the refrigerating requirement exclusively covered by the introduction of cold nitrogen from a supply of liquid nitrogen. The invention further relates to a refrigerating tank, in particular a refrigerating container, which is equipped with at least one supply container for liquid nitrogen which is fed into the interior of the refrigerating tank for adjusting or maintaining a refrigerated atmosphere, in particular a refrigerated atmosphere adjusted to goods stored therein, under the control of a control means, and which is particularly suitable for carrying out the process initially mentioned.

Refrigerating tanks of this type serve for the transport or storage of goods such as foodstuffs, flowers, arms, explosives and the like. These refrigerating tanks can be transported, for instance, by truck, rail or ship and can have the form of standard containers.

It is the object of the invention to devise a process and a refrigerating tank of the type initially mentioned in such a manner that the refrigerating operation is energy-saving and the store of refrigerants available last as long as possible; at the same time, an optimal climate suitable for the goods stored therein is to be maintained in the refrigerating tank. This problem arises particulary in those cooling tanks which are provided with a refrigerating unit entailing drawbacks in respect of operating costs and having to be kept permanently operating. This causes considerable energy costs and, in particular if the refrigerating tank is stored, the pollution and noise annoyance of the environment. For this reason, it is the particular object of the invention to develop refrigerating tanks whose refrigerating requirement is covered exclusively by a supply of liquid air or liquid nitrogen.

According to the invention, a process of the type initially mentioned comprises the improvement that the normally immobile atmosphere is forcibly circulated in arbitrarily selected time intervals or in time intervals determined by measured operating parameters (T, $CO_2$ content, $O_2$ content, humidity) in the interior of the tank during time intervals which are predetermined or determined by measured operating parameters.

In refrigerating tanks cooled by liquid nitrogen exclusively, a circulation of the atmosphere in the interior of the tank was not provided up to now. The result of this was an uneven temperature distribution, so that the cold nitrogen normally introduced from the top cooled the goods stored on top to temperatures far below zero and caused frost damage to them, while the goods stored farther below or the goods stored between other goods were not adequately reached by the cold nitrogen and thus not properly cooled; in the interior of the tank, different temperatures prevailed in different spots. It must further be taken into consideration that a continuously running blower requires considerable amounts of energy for circulating the air, so that according to the invention, the optimal solution proposed is to provide for a circulation of the atmosphere only in arbitrarily predetermined time intervals and for definite periods of time. Practice has proven that this way of operating makes switching on of the blower unnecessary for the major part of the refrigerating period and that still a sufficiently uniform distribution of the refrigeration in the container or tank is achieved.

In practice, initial cooling of the goods in the tank requires the introduction of cold nitrogen for the duration of about five minutes, followed by a circulation of about 15 minutes. Circulation is optionally followed by the repeated introduction of cold nitrogen and repeated circulation, whereupon the desired storage temperature is normally reached. As a rule, i.e. when the refrigerating tank has reached its refrigerating temperature, an introduction of $N_2$ for the duration of up to one minute was only required every hour or so, followed by a circulation of about five minutes.

It was surprisingly found that a brief circulation permits a rapid averaging of the temperature and humidity as well as of the other parameters of the atmosphere in the interior of the refrigerating tank.

It was further found convenient to humidify the atmosphere during circulation. This periodic humidification controlled as a function of the measuring values of relative humidity during circulation has been found adequate for maintaining an optimal atmospheric humidity in the interior of the tank, particularly in the case of transporting fruit, salads, vegetables, meats and the like. On the other hand, an excessive dosage of humidity would needlessly waste energy and water carried along.

It is thus provided according to the invention that, in particular before and/or during the initial cooling of the atmosphere at the start of refrigeration, the measured feedback value of relative humidity in the atmosphere is compared to a set value of humidity and humidification of the atmosphere is effected in the event of a deficiency below the set value of humidity, further refrigeration of the atmosphere being deferred or interrupted until the set value of humidity is reached.

It was found that it is particularly important to measure and take into consideration the feedback value of relative humidity in the refrigerating tank prior to refrigerating the atmosphere therein. If these feedback values of humidity are below a certain limiting value, the feedback value of humidity in the tank can no longer be controlled or increased to the desired level and stored fruit dries up, while packaging material and water-absorbing material becomes humid. It is thus particularly important for a proper operation to adjust the feedback values of humidity in the tank to a certain feedback value prior to refrigeration, which can be done in the course of humidification during an initial circulation.

The first or initial refrigeration step is thus preceded by a circulation and optionally by a humidification as a function of the feedback values of humidity. Once the content of the tank or the atmosphere is cooled, the circulation of the atmosphere is mainly effected as a function of the feedback value of temperature.

In order to average the temperature, humidity, $CO_2$ content, $O_2$ content and the like in the atmosphere of the tank, it is convenient to briefly circulate the atmosphere prior to and/or during the period these parameters are to be measured.

A control of the atmosphere can be achieved by optionally continuously measuring the $O_2$ content of the atmosphere and, in the event of an $O_2$ deficiency, supplying outside air under continuous circulation, while in the event of an $O_2$ excess, an additional evaporation of $N_2$, separate from the introduction of cold $N_2$, is effected either in the tank or outside of it, in the latter case followed by appropriate introduction into the tank. It is preferred to control or initiate the circulation of the atmosphere as a function of the temperature feedback value of the atmosphere.

It has been found convenient not to circulate the atmosphere during the introduction of cold nitrogen; the cold nitrogen impinging on the stored goods can cool these well and the circulation initiated thereafter provides an even distribution of the cooling effect.

For monitoring storage maintenance, it is convenient to optionally continuously record and/or store the prevailing operating parameters and the adjusted operating values of the mechanical and electrical means.

A refrigerating tank of the type initially mentioned according to the invention comprises that only the liquid $N_2$ stored in the supply container is used for generating the refrigeration and that for the circulation of the atmosphere in the interior of the tank, a normally switched off blower is provided which can be switched on by the control means in arbitrarily determined periods or periods depending on certain parameter values, in particular the temperature and/or humidity (relative humidity), for a running period which is predetermined or depending on the parameter values.

The blower and its control means by which the blower can be switched on either arbitrarily or in time periods or running periods depending on certain parameter values of the atmosphere allow a considerable saving in energy at optimal and even temperature distribution in the interior of the refrigerating tank.

It is convenient to provide a humidifying means, for instance a mechanical $H_2O$ atomizer, controlled by the control means, in the circulation cycle, in particular downstream of the blower or in its outlet channel. Other types of means such as injectors, spraying means, surface evaporators (for instance porous substances or sponges) swept over by the atmosphere, vaporizers and the like are also suitable.

A humidifying means located within this area permits an even humidification of the atmosphere in the course of circulation.

The invention further provides for a measuring means for the temperature and/or the humidity content of the atmosphere and/or the $CO_2$ content and/or the $O_2$ content to be located in particular upstream of the blower, for instance in the intake channel. With a measuring means located in this area, the respective parameters of the atmosphere can be measured precisely during circulation and the appropriate control operations can be effected. As already mentioned, it is of advantage to precede the measuring by a brief circulation of the atmosphere so as to pass an averaged atmosphere over the measuring means. It is preferred to provide for the blower to be switched on as a function of the parameters measured by the measuring means, in particular the temperature.

In particular for regulating humidity during initial refrigeration, it is convenient for the control means to comprise a reference unit with a set humidity value; the measuring means supplies a temperature feedback value to the reference unit and the output signal of the reference unit to the control means serves for the release, deferment or interruption of the supply of cold $N_2$ to the atmosphere. This makes it possible to maintain the usually wanted high relative humidity during operation even at comparatively low initial humidity feedback value.

It is further preferred to provide an $N_2$ gasifying means connected to the supply container, preferably located in the interior of the tank, which gasifying means can be switched on on determining an $O_2$ excess in the atmosphere and is preferably located within the area of the blower, but as far removed as possible from the stored goods, in particular within the area of the end wall surface of the refrigerating tank. An introduction of cold nitrogen in the conventional manner would influence the temperature within the container and of the goods stored therein in an undesirable way and too rapidly. For this reason, an evaporating or gasifying means for the liquid nitrogen is provided, from which means the nitrogen is released in an area located as far as possible from the stored goods so as to slowly influence and change the atmosphere and the stored goods in respect of their temperature, humidity and other parameters.

It has been found convenient for the blower to convey the atmosphere essentially perpendicularly from top to bottom and for the blower channel to extend essentially vertically and optionally to be provided in the bottom area with a deflection means directed to the goods. This allows for an improved circulation of the atmosphere through the stored goods which are normally kept on pallets placed set on the floor and permeable for flow and air.

According to the invention, it is convenient to associate the control means with a recording means for all operating values prevailing during the operation and adjusted from the outside. The recording means and/or control means can consist of a computer with microprocessors and data memories.

The invention is explained in detail in the following by means of an exemplary embodiment of a refrigerating tank under reference to the accompanying drawing.

The FIGURE shows a stationary or mobile refrigerating tank 1 conformed, for instance, as a trailer in which goods 2 stored on pallets 3 can be stored and/or transported under refrigeration. In the interior of the refrigerating tank, in particular in the area of its front wall 34 opposite to charging doors 32, a supply container 4 for receiving liquid nitrogen or liquid air is provided. The liquid nitrogen is passed via a line 6 with a control valve 5 to the upper range above the stored goods 2 and there flows out of nozzles indicated by arrows 7 in order to cool the stored goods 2 and the atmosphere in the interior of the refrigerating tank 1.

Arranged in the vicinity of the supply container 4 is a blower 17 causing the circulation of the atmosphere in the interior of the tank 1, such as indicated by arrows 24. This blower may be a fan driven by an electromotor. A measuring means 25 is provided within the area of the intake channel 16 or within the channel itself; this measuring means serves for measuring the parameters of the atmosphere such as temperature, pressure, humidity, $CO_2$ content, $O_2$ content and the like.

An injection means 13 for injecting water at appropriate times terminates in the discharge channel 16' of the blower 16. The water is discharged or injected into the passing atmosphere in the most finely atomized form and entrained by the air in order to establish a desired humidity content in the atmosphere. The necessary water is supplied to the injection means 13 via a line 12 with a control valve 11 from an optionally pressurized water tank 10.

A line 15 by which additional $CO_2$ can be supplied under the control of a control valve 14 from a $CO_2$ tank 9 also terminates in the refrigerating tank.

The $CO_2$ is used for regulating the atmosphere: if it comes from a storage tank for liquid $CO_2$, it also serves for refrigeration. It is noted in this context that the liquid nitrogen used for refrigeration may be wholly or partly replaced by liquid $CO_2$ or that cold (liquid) $N_2$ can be supplied together with cold (liquid) $CO_2$ to the tank 1 for refrigeration. It is also possible to cool the refrigerating tank 1 by means of $CO_2$ only and by means of $N_2$ and $CO_2$. In this case, the container 4 serves for storing $CO_2$ and the container 9 could be used for supplying $N_2$ for regulating the atmosphere. The use of $N_2$ and/or $CO_2$ depends on the required composition of the atmosphere. Otherwise, refrigeration and the course thereof are the same in the case of $N_2$ and $CO_2$. $N_2$ as used herein is understood to mean $N_2$ or technically produced liquid air.

A vaporizing means 19 for vaporizing nitrogen taken from the supply container 4 in order to compensate nitrogen losses in the atmosphere is located between the front wall 34 and the supply container 4. The vaporizing means 19 could also be located in the compartment 27 and the vaporized $N_2$ could be supplied to the tank via a line.

The introduction of the cold nitrogen from the supply container 4 to the interior of the tank 1 is controlled via a line 21 and the control valve 5 by a control means 8. The control means 8 further controls the motor of the blower 17 via a line 18. The supply of additional cold nitrogen by the vaporizing means 19 is controlled via a line 33 and a control valve 20. The supply of water by the injection means 13 is controlled via the line 23 and the control valve 11. The control means 8 further serves for regulating the supply of $CO_2$ which is effected via a line 22 and the control valve 14.

The control means 8 may further be connected to a controllable means for supplying atmospheric air, for instace a compressor 18 by means of which atmospheric air can be introduced into the tank 1 in order to maintain a certain $O_2$ level. Instead of or in addition to the compressor 18, it would also be possible to use a storage tank for liquid or compressed $O_2$ carried along for supplying $O_2$ into the tank 1 when needed. Associated with the control means 8 is the measuring means 25 for measuring the composition of the atmosphere by means of a $CO_2$ sensor, an $O_2$ sensor, an $N_2$ sensor, an $H_2O$ sensor, an ethylene sensor, a temperature sensor, a pressure sensor or the like. The measuring means 25 is conveniently located upstream of the intake side end or downstream of the outlet side end 24 of the blower channel.

Further provided is a recording means 29 particularly associated with the control means 8 for recording all operating parameters during cooling or during the refrigerating operation in order to record faulty conditions or defects in the plant.

The control means 8, the $CO_2$ container 9, the water container 10 and power sources or batteries required for supplying the electrical means are provided in a separate compartment 27 separated from the refrigerating tank 1 by the front wall 31. The supply container 4 and the blower 17 are located in a separate compartment 32 separated from the storage space 30 by a coarse screen 28 protecting the compartment 31 from damage by stored goods 2. It is convenient to provide the supply container 4 directly in the refrigerating tank 1 as refrigeration losses of the supply container 4 can be directly applied for refrigerating the goods or the atmosphere.

After storing the goods 2, cooling of the atmosphere is effected by introducing cold nitrogen from the supply container 4 into the storage space 30. This is preceded by a measurement of the temperature and in particular of the humidity of the atmosphere. If the humidity content of the atmosphere is too low at the respective temperature, cooling is interrupted and water is injected by the injection means 13 in the course of circulation so as to increase the humidity content of the atmosphere. Once the desired humidity value is reached, the introduction of further nitrogen is resumed, while the circulation is interrupted during this time. This operation can be repeated several times until the desired temperature of storage or of the atmosphere is reached. During the operation or after adjusting the desired refrigeration temperature, the blower 17 is switched on only periodically for averaging the atmospheric parameters if either the operating parameters have changed in a certain manner, if a measurement is to be effected or if an arbitrary circulation is to be initiated.

It goes without saying that the blower 17 switches on when the temperature of the atmosphere falls below a predetermined level in order to average the atmosphere and measure the averaged atmosphere and start refrigeration by introducing nitrogen if necessary.

The measuring means can further be provided with an $O_2$ sensor in particular for the continuous measuring of the $O_2$ content. If excessive oxygen is determined during initial refrigeration, conventional cooling is maintained until a desired refrigerating temperature is reached. If then, or later on under regulated conditions, an oxygen deficiency is determined after reaching the refrigerating temperature, oxygen or air may still be supplied from the outside or the environment, for instance by means of the adjustable compressor 18 and the atmosphere is averaged by means of circulation. If the excess in oxygen continues after this or under regulated conditions, $N_2$ gasification by means of the vaporizing means 19 is effected, optionally followed by circulation.

The humidity injection means 13 can have the form of e.g. mechanical pressurized $H_2O$ atomizers by means of which pressure atomizing can be effected.

The control means 8 maintains the intermittent operation of the blower either on the basis of input data or on the basis of the operating parameters measured by the measuring means 25. It was found that an averaging of the atmosphere is accomplished after a few minutes of circulation, five minutes of circulation at the most and that the operating parameters can then be measured with accuracy.

Particularly in view of extended storage periods of goods under refrigeration and a determined composition of the atmosphere, it is of advantage to record and store all the temperatures, the composition of the atmosphere, the relative humidity, environmental temperature and all further operating parameters in a recording unit in order to be able to determine an orderly or defective operation during storage after the end of the storage period. An optimal storage program can be controlled by means of the feedback values of the operating parameters supplied to the control means 8 and the set values supplied by data carriers or stored data. In order to prevent unauthorized intervention during storage, the control means 8 can comprise a key-operated switch acting on its memory unit permitting the detection of interference into the program. This also permits the detection of interference into the program course or the inputting of data into the control means 8 during transports of extended duration. Conveniently, all the valves, regulating means, adjusting means and the like, including those which are manually operable, are provided with sensors transmitting type and time of manual actuation to the recording means for storage or a closing means such as a door, lid, cover or the like whose opening is sensed by the recording means and recorded thereby is provided to prevent access to the control means and/or recording means and all further means serving for the adjustment of the atmosphere and/or temperature.

On principle, all the functions of the refrigerating tank 1, in particular the control of the valves, the switching on and off of the electrical means, in particular the blower motor, the introduction of additional gases or the throughput of the atmosphere through the circulation cycle can be controlled, and conveniently monitored, by the control means 8. For this purpose, the control means 8 receives the signals of the measuring means 25 comprising an $O_2$ sensor, an $N_2$ sensor, a $CO_2$ sensor, an ethylene sensor, a temperature sensor, an $H_2O$ steam sensor or humidity sensor and optionally further sensors, for instance for further gas components, measuring values of the temperature of the goods stored, the environmental temperature and the like.

It is particularly convenient to measure the environmental temperature and the temperature of the stored goods by means of further measuring sensors and take the ratio of ambient temperature to the temperature of the stored goods into consideration for the circulation and the introduction of $N_2$.

The control means 8 which takes over all the regulating and control functions for the means of the refrigerating tank is provided with appropriate program and data memories and can have an operating system with self-diagnosis in order to be able to indicate the operating situation to the operator at any given time, as well as with a clock module, regulating and control modules, interfaces to the operating unit and to output units or overriding computers. A recordal and storage of data of operating conditions and the provision of memory facilities required therefor is particularly envisaged over an extended period, for instance of up to 20 days. The control means 8 is further provided with a puffered emergency power generating unit and a voltage monitor.

All the parameters to be monitored, measured and controlled and all the necessary changes of conditions and switching operations, in particular unauthorized changes of operating parameters and unauthorized operation, are stored in memory units of the recording unit 29 in order to be able to determine the reasons for perishing of the stored goods, defective operation and the like. The memories used are of the type whose memory content is not lost in the event of power failure and it is provided that the content of the memories containing data covering the entire storage period cannot be deleted or overwritten unless a code is put in or after completed printout. Further associated with the computer are external signalling means which emit an alarm signal in the event of failure or if service is required.

The access to the compartments 27 and/or 31 can be closed off by means of a door or the like accessible from the outside in such a manner that any opening of the door will be recorded by the recording unit. All adjusting and control means authorized to be manually actuated can be monitored by the recording means in order to record the type and manner of actuation.

Inputting of data into the control means 8 is effected by means of an inputting unit in the form of a card reader or other reading means for data carriers such as punched tapes, magnetic tapes, telephone modems, wireless data inputs and the like. Data to be input and possibly to be stored are gas concentration, temperature, pressure, humidity, $O_2$, $N_2$, $CO_2$ and $H_2O$ content, type of goods stored, expected duration of transport and the like. According to a program stored in the control means 8 or to be particularly stored for the specific goods, the control program is made and initiated after inputting of a starting signal and runs as a function of the measuring signals supplied by the control means 8 during operation.

The goods must normally be unloaded immediately after transport. Sudden increases in temperature, however, are definitely detrimental, particularly if the goods involved are foodstuffs, such as fruit. The result is the precipitation of condensed water and the formation of mildew. According to the invention, the control means 8 is provided with a memory for inputting, via the input unit, a further parameter, in particular in addition to the transport time, causing the onset of a slow, continuous or intermittent increase of the storage temperature and adjusting or regulating this temperature to the environmental temperature to be expected after opening of the refrigerating tank. The atmosphere itself remains unchanged as to its composition during this temperature increase and continues to be optimally adjusted (humidity). The duration of this temperature increase is adjusted to one to three days, preferably two days. The control means preferably uses a separate switching unit for effecting this temperature increase. This operation and this control procedure offer a considerable saving in refrigerating energy in addition to an improvement in the quality of the goods.

It is understood that the features disclosed in the claims can be combined in any given effective manner.

I claim:

1. A process for adjusting and maintaining a refrigerated atmosphere in a container for a storage period comprising:
   decreasing the temperature of the atmosphere in the container by introducing a liquid nitrogen refrigerant into said container from a supply container carried along with said container;
   measuring the parameters of temperature, oxygen content, carbon dioxide content, and humidity;
   circulating said atmosphere prior to measurement of said parameters, and further circulating said atmosphere at time intervals in response to a feedback value of at least one of the parameters for a period determined by said feedback value of at least one of said parameters;
   increasing said humidity of said atmosphere by humidifying means in response to measured humidity;
   increasing said carbon dioxide content in response to measured carbon dioxide content by introducing carbon dioxide from a supply container carried along with said container; and
   increasing said temperature of said atmosphere over a predetermined period immediately prior to the end of the storage period so that the temperature of said atmosphere corresponds to the ambient temperature outside said container expected at said end of said storage period.

2. A process for adjusting and maintaining a refrigerated atmosphere in a container for a storage period comprising:
- decreasing the temperature of the atmosphere in the container by introducing a liquid nitrogen refrigerant into said container from a supply container carried along with said container;
- measuring the parameters of temperature, oxygen content, carbon dioxide content, and humidity;
- circulating said atmosphere during arbitrarily selected time intervals for an arbitrarily selected running period;
- increasing said carbon dioxide content in response to measured carbon dioxide content by introducing carbon dioxide from a supply container carried along with said container; and
- increasing said temperature of said atmosphere over a predetermined period immediately prior to the end of the storage period so that the temperature of said atmosphere corresponds to the ambient temperature outside said container expected at said end of said storage period.

3. A process for adjusting and maintaining a refrigerated atmosphere in a container for a storage period comprising:
- decreasing the temperature of the atmosphere in the container by introducing a refrigerant into said container from a supply container carried along with said container;
- intermittently circulating said atmosphere in response to a control means; and
- increasing said temperature of said atmosphere over a predetermined period immediately prior to the end of the storage period so that the temperature of said atmosphere corresponds to the ambient temperature outside said container expected at said end of said storage period.

4. The process of claim 3 wherein said control means causes circulation of said atmosphere in response to temperature as a measured parameter.

5. The process of claim 3 wherein oxygen content of said atmosphere is measured and said oxygen content is increased by introduction of ambient air from outside said container during circulation of said atmosphere.

6. The process of claim 3 wherein humidity of said atmosphere is increased by humidifying means during circulation of said atmosphere.

7. The process of claim 3 wherein refrigerant is introduced into said container only during periods when said circulation of said atmosphere is not occurring.

8. The process of claim 3 wherein said refrigerant is selected from the group consisting of liquid nitrogen, liquid carbon dioxide, and mixtures thereof.

9. The process of claim 3 wherein said predetermined period of temperature increase of said atmosphere immediately prior to said end of said storage period extends from one to three days.

10. The process of claim 9 wherein said predetermined period of temperature increase is two days.

11. An apparatus for cooling and maintaining goods in a refrigerated state for a storage period comprising:
- a container for storing said goods and maintaining a refrigerated atmosphere;
- control means for adjusting said atmosphere in said container;
- a liquid nitrogen refrigerant retained in a supply container, said supply container actuable by said control means;
- measuring means for determining the parameters of temperature, humidity, nitrogen content, and carbon dioxide content of said atmosphere;
- a blower actuable by said control means, said blower operating in response to the feedback value of at least one of said measured parameters for a running period depending on said feedback value of at least one of said parameters;
- humidifying means actuable by said control means to increase said humidity of said atmosphere in response to said measured humidity;
- liquid carbon dioxide retained in a storage tank, said storage tank actuable by said control means, said carbon dioxide releasable into said container for adjusting said carbon dioxide content of said atmosphere; and
- a temperature increasing circuit actuable by said control means, said circuit capable of increasing the temperature of said atmosphere over a predetermined period from said refrigerated temperature to the environmental temperature outside said container expected at the end of said storage period.

12. An apparatus for cooling and maintaining goods in a refrigerated state for a storage period comprising:
- a container for storing said goods and maintaining a refrigerated atmosphere;
- control means for adjusting said atmosphere in said container;
- a liquid nitrogen refrigerant retained in a supply container, said supply container actuable by said control means;
- measuring means for determining the parameters of temperature, humidity, nitrogen content, and carbon dioxide content of said atmosphere;
- a blower actuable by said control means, said blower operating in response to arbitrarily selected time intervals for an arbitrarily selected running period;
- humidifying means actuable by said control means to increase said humidity of said atmosphere in response to said measured humidity;
- liquid carbon dioxide retained in a storage tank, said storage tank actuable by said control means, said carbon dioxide releasable into said container for adjusting said carbon dioxide content of said atmosphere; and
- a temperature increasing circuit actuable by said control means, said circuit capable of increasing the temperature of said atmosphere over a predetermined period from said refrigerated temperature to the environmental temperature outside said container expected at the end of said storage period.

13. An apparatus for cooling and maintaining goods in a refrigerated state for a storage period comprising:
- a container for storing said goods and maintaining a refrigerated atmosphere;
- a bottled refrigerant located inside said container, said refrigerant selected from the group consisting of liquid nitrogen and liquid carbon dioxide;
- a blower for circulating said atmosphere;
- control means to intermittently actuate said blower; and
- a temperature increasing circuit, said circuit capable of increasing the temperature of said atmosphere over a predetermined period from said refrigerated state to the environmental temperature outside said container expected at the end of said storage period.

14. The apparatus of claim 13 wherein said control means actuates said blower in response to a feedback value of at least one measured atmosphere parameter.

15. The apparatus of claim 14 wherein said parameter is temperature.

16. The apparatus of claim 15 wherein said parameter is humidity.

17. The apparatus of claim 16 containing a humidifier actuable in response to a feedback value determined by said humidity parameter.

18. The apparatus of claim 14 further comprising means for recording predetermined desired values of said parameters and said parameters of said atmosphere during operation.

19. The apparatus of claim 13 further comprising means for introducing nitrogen in gaseous form in response to excess oxygen content.

* * * * *

UNITED STATES PATENT AND TRADEMARK OFFICE
CERTIFICATE OF CORRECTION

PATENT NO. : 4,833,892

DATED : May 30, 1989

INVENTOR(S) : R. Wassibauer et al

It is certified that error appears in the above-identified patent and that said Letters Patent is hereby corrected as shown below:

Column 5, line 63, delete "wall 31" and insert --wall 34--.

Column 5, line 64, delete "compartment 32" and insert --compartment 31--.

Signed and Sealed this

Thirteenth Day of March, 1990

Attest:

JEFFREY M. SAMUELS

*Attesting Officer*   *Acting Commissioner of Patents and Trademarks*